DIRECTION DETERMINATION FOR CURVE FOLLOWERS INCLUDING
RING FOR PROVIDING DIGITAL SIGNALS
Filed Jan. 5, 1966 2 Sheets-Sheet 1

INVENTOR
JOHN J. LEIMER
BY Donald F Voss
ATTORNEY

May 14, 1968 J. J. LEIMER 3,383,516

DIRECTION DETERMINATION FOR CURVE FOLLOWERS INCLUDING RING FOR PROVIDING DIGITAL SIGNALS

Filed Jan. 5, 1966 2 Sheets-Sheet 2

United States Patent Office 3,383,516
Patented May 14, 1968

3,383,516
DIRECTION DETERMINATION FOR CURVE FOLLOWERS INCLUDING RING FOR PROVIDING DIGITAL SIGNALS

John J. Leimer, Rochester, Minn., assignor to International Business Machines Corporation, Armonk, N.Y., a corporation of New York Filed Jan. 5, 1966, Ser. No. 518,841
7 Claims. (Cl. 250—219)

ABSTRACT OF THE DISCLOSURE

An electronic ring is advanced so as to provide digital signals which are indicative of beam directions and which have a constant phase relationship with beam deflection signals for a curve follower scanner. A beam advance signal for advancing the center of the curve follower circle samples the ring to determine the active position thereof. The active position at beam advance time is indicative of beam direction. The beam directions are stored in latches and subsequently transferred to a utilization device.

This invention relates to curve followers and more particularly to apparatus for determining the direction that the beam is moving as it follows along the edge of a pattern or character.

Curve followers are well known in the prior art and are employed in pattern recognition systems for the purpose of deriving information to facilitate recognition of an unknown pattern. The information contained in the vectors representing the direction of motion and the relative or absolute position of the scanning beam as it moves about the pattern together with other pertinent information enables recognition of the pattern. In some systems the scanning beam is moved in a circular pattern where the center of the circle follows along the edge of the pattern. The center of the circle is made to advance by appropriately increasing and decreasing the size of the circle. The direction in which the center of the circle moves as it follows the edge of the pattern is dependent upon the time and duration that the size of the circle is increased or decreased.

In prior art systems, the direction of movement was ascertained by generating time derivatives of the filtered horizontal and vertical deflection signals. This involves rather complex circuitry which is relatively difficult to maintain. Also in these systems, real time changes are quite likely to occur and this is a greater problem than in the present invention. Further, a matter of lesser significance is the fact that the direction is ascertained after the center of the circle has moved. The present invention provides for digital determination of the direction of motion of the scanner beam at the time the center of the follower circle is advancing. The digital system is much simpler in construction and easier to maintain in working condition. Further, by knowing the direction of movement at the time the center of the circle is to move, it is easier to coordinate directional with positional information. Both directional and positional information are used to facilitate recognition of the pattern followed.

Accordingly, it is a prime object of the invention to provide improved apparatus for determining direction of movement of the scanner beam in curve followers.

Another very important object of the invention is to provide apparatus for digitally determining the direction of motion of a scanner beam in a curve follower.

Still another very important object of the invention is to ascertain direction of motion of the scanner beam in a curve follower at the time the scanner beam pattern is to advance.

A more specific object of the invention is to provide apparatus for determining direction of a scanner beam in a curve follower which is relatively simple.

Another more specific object of the invention is to provide apparatus for determining direction of a scanner beam in a curve follower which is relatively easy to maintain in operative condition.

The foregoing and other objects, features and advantages of the invention will be apparent from the following more particular description of a preferred embodiment of the invention, as illustrated in the accompanying drawings.

Figure 1:
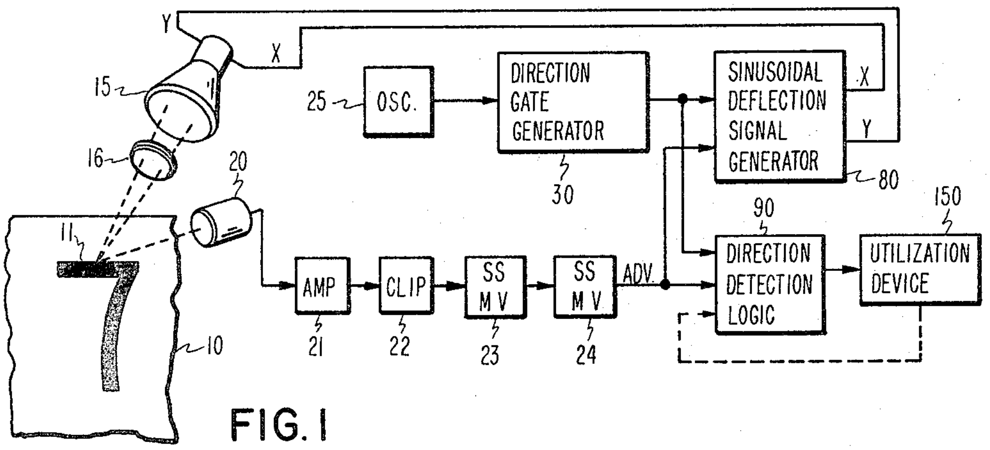
FIG. 1 is a block diagram illustrating the invention.

With reference to the drawings, the invention is shown by way of example in general form in FIG. 1. In this example, the scanner consists of a conventional cathode ray tube 15. The beam of cathode ray tube 15 is directed onto document 10 containing the pattern to be followed by means of the lens 16. As the beam follows the edge of the pattern on document 10, light is reflected to photomultiplier tube 20. The amount of light reflected, of course, depends upon whether the beam is impinging upon the background of document 10 or upon the pattern. The output signal from photomultiplier tube 20 is considered the video signal and it is applied to amplifier 21. The amplified signal is then digitized by clipping circuit 22 which essentially determines whether or not the signal is above or below a particular threshold.

Figures 2, 3, 4:
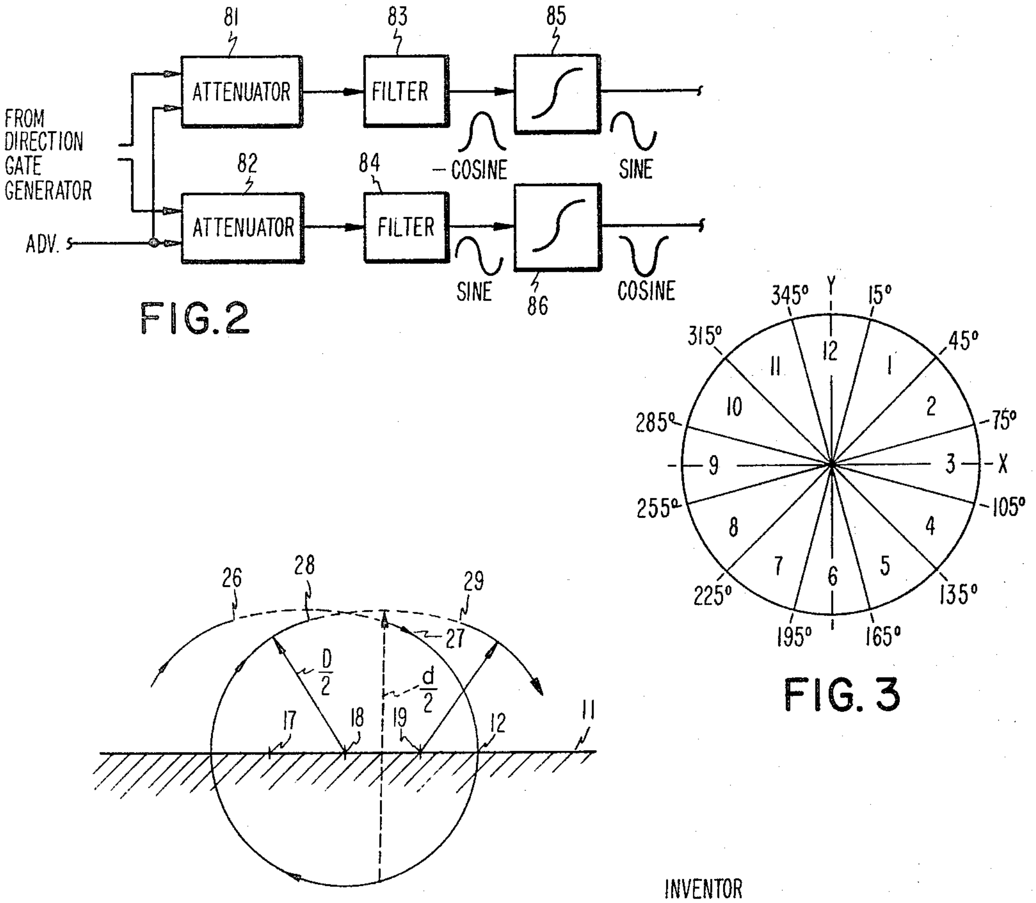
FIG. 2 is a block diagram showing the elements of the sinusoidal deflection signal generator of FIG. 1.
FIG. 3 is a diagram illustrating the directions of movement the scanner beam can have when following along the edge of a pattern.
FIG. 4 is a diagram illustrating how the center of the scanning circle is advanced along the edge of the pattern being followed.

The beam of the cathode ray tube 15 of course is being deflected according to a particular scanning pattern and in this particular example in a circle by means of the sinusoidal deflection signal generator 80. The pattern that the beam takes and the manner in which the beam is caused to follow along the edge of the pattern is best illustrated in FIG. 4. In order to follow along the edge 11 of the pattern on document 10, the beam of the cathode ray tube 15 is moving in a circle with the center of the circle located at the edge 11. In this particular instance, the beam is moving clockwise with the center of the circle described by the beam being first at point 17.

In order for the center of the circle to follow along the edge 11, the diameter of the circle is made to increase at a particular point in time after the beam has made a transition from the background of 10 into the pattern thereon. In this particular example, an advance signal is developed 255° after the beam engages the pattern to be followed. The advance signal then has a duration for approximately 30°. The first advance signal is given at point 26 and the diameter of the circle is increased. The beam then moves along an arcuate path with this increased diameter for a duration equal to approximately 30° or any other suitable amount of advance desired. Thereafter, the diameter of the circle is attenuated to its normal size and this effectively causes the center of the normal size circle to move from point 17 to point 18. The attenuation takes place at approximately point 27. A second advance signal is given at point 28 which is 255° after the beam has engaged the edge 11 at point 12. The second advance signal causes the diameter to increase and the beam moves with this increased diameter for approximately 30° or to a point 29. At point 29, the diameter of the circle is again attenuated to the normal size. The center of the normal size circle has now moved from point 18 to point 19. This action continues until the follower circle has completely followed the pattern.

The direction and distance which the circular motion moves can be defined as the Advance. This can also be considered vector $A\angle\alpha$. The diameter of the normal size circle is D and the diameter of the amplified circle is $d$. It should be recognized that the normal circle could have the large diameter and the diameter of the other circle could be attenuated.

The magnitude of the advance $$A=\Delta D \sin \frac{\alpha}{2}$$

where $\Delta D=|D-d|$ the absolute value of the difference between the two diameters.

$\alpha$=angle of duration, i.e., the rotational period during which the circle diameter is amplified or attenuated.

The direction of the Advance $a$ is:

$$a=B+\frac{\alpha}{2}+90^\circ$$

for clockwise rotation where $D<d$ $$a=B-\frac{\alpha}{2}-90^\circ$$

for counter-clockwise rotation where $D<d$ $$a=B+\frac{\alpha}{2}-90^\circ$$

for clockwise rotation where $D>d$ $$a=B-\frac{\alpha}{2}+90^\circ$$

for counter-clockwise rotation where $D>d$

B equals the angle at which the amplification or attenuation of the circle diameter starts. In most systems, since the parameters D, $d$, and $\alpha$ are fixed or known, the magnitude of the Advance is also known. Therefore, the additional information to be detected is the direction of the Advance. In this example, if the angle B is determined and $\alpha$ is either fixed or known, then $a$ can be measured. The resolution of direction can be made as fine or coarse as necessary for the recognition system or other utilization device. In other words, in this particular example, the resolution of direction is twelve sectors of motion each being approximately 30°. The sectors or directions can then be defined according to a clock system. This is shown in FIG. 3. It should be noted that the invention also finds utility for determining direction for trap and escape routines in a curve follower and for determining the direction at the time of initiation and termination of scanning routines.

The circular motion of the scanning beam can be generated in several different manners. In FIG. 2, digital signals from the direction gate generator 30 are applied to attenuators 81 and 82. The output signals from attenuators 81 and 82 are square waves having an amplitude at one of two levels depending upon whether or not an Advance signal is being applied to the attenuators with a duration of the Advance pulse. The outputs of attenuators 81 and 82 are applied to narrow band filters 83 and 84 respectively. The output signals from filters 83 and 84 are a minus co-sine and a sine signal respectively. The signal from filter 83 is applied to integrator 85 and the resultant signal is a sine wave which is applied to the X or horizontal deflection of cathode ray tube 15. The output of filter 84 is applied to integrator 86. The output of integrator 86 is a co-sine signal and it is applied to the Y or vertical deflection of cathode ray tube 15.

It is seen that the sinusoidal wave forms applied to the deflection circuits have a constant relationship in time to the direction gate signals from 30. Thus, the direction of movement of the circle center can be detected by determining which direction gate is active at the time the Advance signal is applied to generator 80. It should be recognized that generator 80 can be implemented in forms other than that shown in FIG. 2. For example, the oscillator, the shift circuits, the attenuators, and the integrators shown in FIG. 1 of U.S. patent application Ser. No. 305,464 filed Aug. 29, 1963, now Patent 3,297,988 by E. C. Greanais et al., for Resolution Apparatus, and assigned to the same assignee of the present invention could be used. It should also be noted that the Greanias et al. application includes a direction determining apparatus of the type which generates time derivatives of the filtered horizontal and vertical deflection signals.

Figures 5, 6:
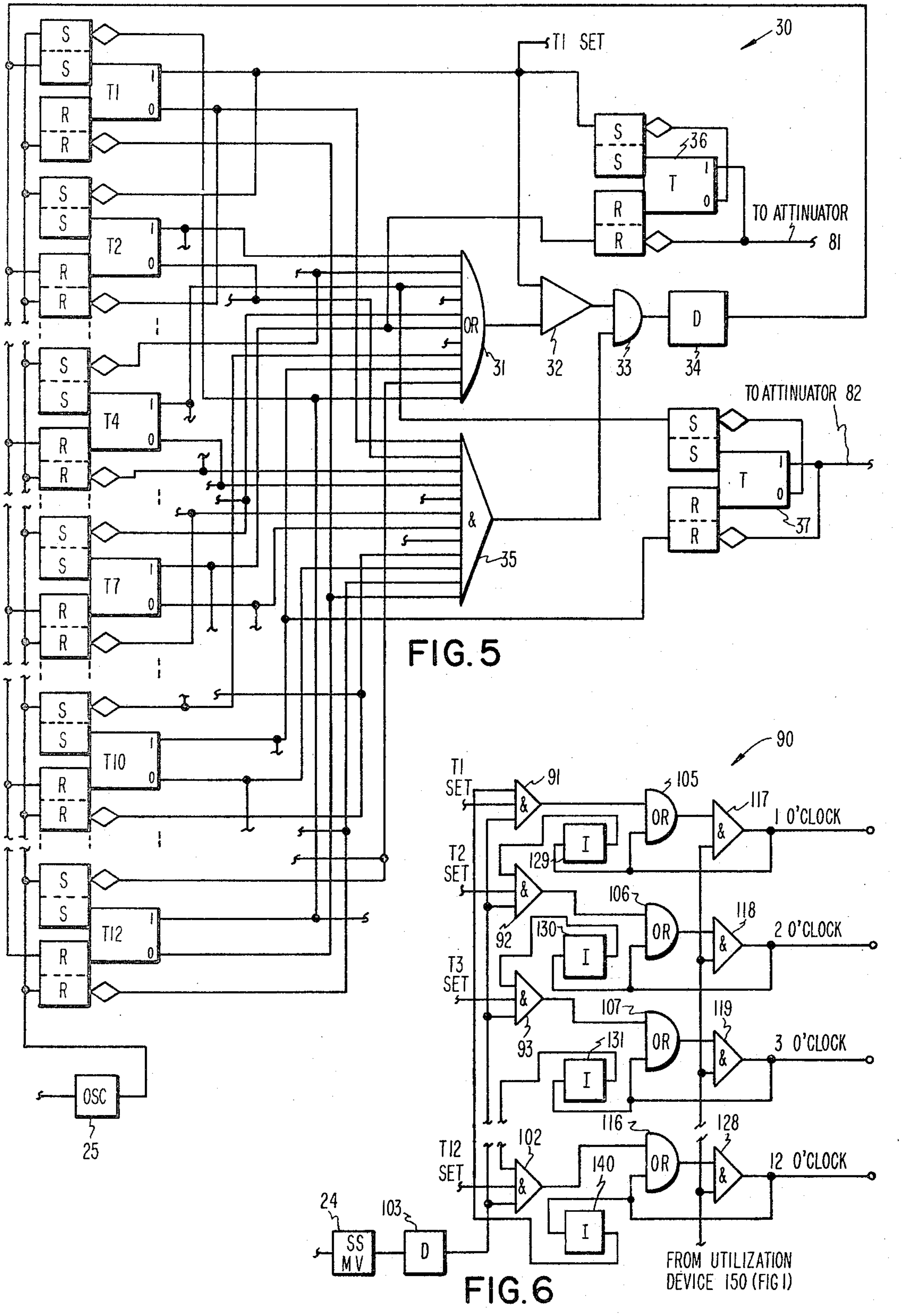
FIG. 5 is a detailed logic diagram of the direction gate generator of FIG. 1.
FIG. 6 is a detailed logic diagram of the direction detection logic of FIG. 1.

The details of the direction gate generator 30 are shown in FIG. 5. Essentially, the direction gate generator 30 is a twelve position ring connected to be advanced by pulses from oscillator 25 and logically controlled so that only one position can be on at any one time. In this particular example, the ring consists of triggers. The shift pulses are applied to all the gated set and reset inputs of triggers T1 through T12. The set and reset outputs of the triggers T1 through T11 are applied to the DC gates of the set and reset inputs of the adjacent higher order position trigger and the set and reset outputs of trigger T12 are applied to the DC gates of the set and reset inputs of trigger T1.

To insure that only one trigger of the triggers T1 through T12 is on at any one time, the set outputs of triggers T2 through T12 are applied to inputs of logical OR circuit 31. The output of logical OR circuit 31 is connected to an input of logical AND circuit 32 which also has an input connected to the set output of trigger T1. By this arrangement logical AND circuit 32 will have an output if trigger T1 is on and any of the other triggers T2 through T12 is on. The output of logical AND circuit 32 is connected to an input of logical OR circuit 33 which also has an input connected to the output of logical AND circuit 35. The output of logical OR circuit 33 is connected to an input of delay 34 the same having its output connected to the DC reset inputs of triggers T2 through T12 and to the DC set input of trigger T1. Hence, if trigger T1 and any of the other triggers T2 through T12 are on, trigger T1 is set to be on while the other triggers T2 through T12 are reset. Delay circuit 34 permits overlap gating and permits switching noise signals within the ring to be ignored. The inputs to logical AND circuit 35 are connected to the reset outputs of triggers T1 through T12. By this arrangement if all of the triggers T1 through T12 are off, trigger T1 will be set by the pulse passed via logical OR circuit 33 and delay circuit 34. These arrangements provide for the initial starting conditions when power is applied and also facilitates restoration of the one and only one condition if some noise signal tends to violate the condition.

The set output of trigger T1 is connected to the set input of trigger 36 which is gated by its reset output. The reset input of trigger 36 is connected to the set output of trigger T7 which is gated by the set output. The set output of trigger 36 is connected to one input of attenuator 81 in FIG. 2. Trigger 37 has its gated set input connected to the set output of trigger T4 and its gated reset input connected to the set output of trigger T10. The set output of trigger 37 is connected to an input of attenuator 82 in FIG. 2. By this arrangement the set and reset outputs of triggers T1 through T12 form signals with a constant phase relationship with the sinusoidal functions applied to the deflection system of cathode ray tube 15. It should be recognized that the ring formed by triggers T1 through T12 of the direction gate generator 30 could be replaced by a tapped delay line or a series of monostable multivibrators. Further, the triggers T1 through T12 could be set for variable lengths of time and thus non-uniform sectors of direction could be detected. Also, the direction gates provided by triggers T1 through T12 could initiate ramp functions that would be terminated with the Advance pulse from singleshot multivibrator 24 of FIG. 1. This possible alternative will become more clear during the description of the direction detection logic 90. However, by such an arrangement, it is possible to store an analog of the direction.

The direction detection logic 90 is shown in detail in FIG. 6. The set outputs of triggers T1 through T12 are sampled by means of logical AND circuits 91 through 102. The Advance pulse developed by singleshot multivibrator 24 is applied to these logical AND circuits via delay 103. The Advance pulse has a duration equal to approximately 30° and it occurs approximately 255° after the beam has engaged edge 11 of the pattern on document 10. The engagement of the beam with edge 11 is detected by means of photomultiplier tube 20 and the output therefrom after being amplified and clipped fires singleshot multivibrator 23 which has a period of approximately 255°. Thereafter, singleshot multivibrator 23 times out and singleshot multivibrator 24 is fired.

The outputs of logical AND circuits 91 through 102 are connected to inputs of latches formed by logical OR circuits 105 through 116 and logical AND circuits 117 through 128. The outputs from logical AND circuits 117 through 128 represent the twelve directions, one o'clock through twelve o'clock respectively. Further, the outputs from logical AND circuits 117 through 128 are connected to inputs of inverters 129 through 140. The outputs of inverters 129 through 139 are connected to inputs of logical AND circuits 92 through 102 and the output of inverter 140 is connected to an input of logical AND circuit 91. Logical AND circuits 117 through 128 are normally conditioned and are de-conditioned only after the information representing the direction has been transferred. In this particular example, the information from these logical AND circuits is transferred to utilization device 150 which can be character or pattern recognition circuitry for recognizing the pattern on document 10. After the information has been transferred from logical AND circuits 117 through 128, utilization device 150 sends a signal at a down level to de-condition the logical AND circuits 117 through 128. It should be noted that delay 103 permits any adjustment for real phase delays in the system. The direction latches formed by the logical OR circuits 105 through 116 and the logical AND circuits 117 through 128, of course, could be in the form of triggers or other resettable storage devices.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Beam direction determination apparatus for a curve follower comprising:

means for generating sequentially occurring digital signals indicative of beam directions and having a constant phase relationship with beam deflection signals;

means for developing and advance signal for altering the magnitude of said beam deflection signals; and means responsive to said advance signal for detecting which digital direction signal is occurring.

2. The apparatus of claim 1 wherein said beam deflection signals are developed from said digital direction signals.

3. The apparatus of claim 1 wherein said digital signal generating means consists of a ring having a number of positions corresponding to a predetermined number of beam directions.

4. The apparatus of claim 3 further comprising means for insuring only one position of said ring is active at any one time.

5. Beam direction determination apparatus for a curve follower comprising:

deflection signal generating means for developing beam deflection signals;

means for generating sequentially occurring digital signals indicative of beam directions and having a constant phase relationship with said beam deflection signals;

means for developing an advance signal and applying same to said deflection signal generating means for altering the magnitude of said deflecting signals; and means responsive to initiation of said advance signal for detecting which digital direction signal is occurring.

6. The apparatus of claim 5 wherein said deflection signal generating means is responsive to said digital signals for developing said beam deflection signals.

7. The apparatus of claim 5 wherein said means for generating sequentially occurring digital signals includes a basic timing clock and means responsive to the signals from said timing clock for developing said digital beam direction signals.

References Cited

UNITED STATES PATENTS

| | | | |
|---|---|---|---|
| 3,248,699 | 4/1966 | Essinger et al. | 340—146.3 |
| 3,297,988 | 1/1967 | Greanias et al. | 340—146.3 |

RALPH G. NILSON, *Primary Examiner.*

M. ABRAMSON, *Assistant Examiner.*